United States Patent
Schrade

(10) Patent No.: US 10,729,986 B2
(45) Date of Patent: Aug. 4, 2020

(54) INTERACTIVE FAIRGROUND RIDE, IN PARTICULAR ROLLER COASTER

(71) Applicant: Mack Rides GmbH & Co. KG, Waldkirch (DE)

(72) Inventor: Stephan Schrade, Teningen (DE)

(73) Assignee: Mack Rides GmbH & Co. KG, Waldkirch (DE)

( * ) Notice: Subject to any disclaimer, the term of this patent is extended or adjusted under 35 U.S.C. 154(b) by 278 days.

(21) Appl. No.: 15/765,641

(22) PCT Filed: Jun. 7, 2016

(86) PCT No.: PCT/EP2016/062925
§ 371 (c)(1),
(2) Date: Apr. 3, 2018

(87) PCT Pub. No.: WO2017/059967
PCT Pub. Date: Apr. 13, 2017

(65) Prior Publication Data
US 2018/0250601 A1 Sep. 6, 2018

(30) Foreign Application Priority Data
Oct. 6, 2015 (DE) .................. 10 2015 117 012

(51) Int. Cl.
*A63G 33/00* (2006.01)
*A63F 9/00* (2006.01)
(Continued)

(52) U.S. Cl.
CPC ............ *A63G 33/00* (2013.01); *A63F 9/0096* (2013.01); *A63G 7/00* (2013.01); *A63G 25/00* (2013.01);
(Continued)

(58) Field of Classification Search
CPC .......... A63G 7/00; A63G 25/00; A63G 33/00; A63F 9/0096; B60W 10/04; B60W 50/10
(Continued)

(56) References Cited

U.S. PATENT DOCUMENTS 4,846,467 A * 7/1989 Rosson ................. A63F 9/0096
273/445
4,991,514 A * 2/1991 Powell ................... A63G 25/00
104/292

(Continued)

FOREIGN PATENT DOCUMENTS

DE 10245150 4/2004
EP 2105174 A1 * 9/2009 ............... A63K 3/02
(Continued)

OTHER PUBLICATIONS

Patent Cooperation Treaty, "International Search Report," and English-translation thereof, issued in International Application No. PCT/EP2016/062925, by European Searching Authority, document of 6 pages, dated Sep. 2, 2016.
(Continued)

Primary Examiner — Zachary L Kuhfuss
(74) Attorney, Agent, or Firm — Akerman LLP; Peter A. Chiabotti

(57) ABSTRACT

For the vehicles of an interactive fairground ride, in particular a rollercoaster, control consoles are proposed which are equipped with a control button and a display unit and are assigned to each passenger. These control buttons and, if appropriate, the display units of all the control consoles, are connected by means of a transmitter, by radio or by cable, to an evaluation and control unit which detects the reaction times for all passengers and calculates a mean value, the collective reaction time, therefrom. A signal for starting the vehicle is not generated until after the expiry of the collective reaction time. In a fairground ride of this kind, the
(Continued)

emphasis is on the interaction between all the passengers of a vehicle.

18 Claims, 2 Drawing Sheets

(51) Int. Cl.
    *A63G 25/00*     (2006.01)
    *A63G 7/00*     (2006.01)
    *B60W 50/10*     (2012.01)
    *B60W 10/04*     (2006.01)
    *A63J 5/02*     (2006.01)

(52) U.S. Cl.
    CPC ............... *A63J 5/025* (2013.01); *B60W 10/04* (2013.01); *B60W 50/10* (2013.01)

(58) Field of Classification Search
    USPC .......................................................... 104/60
    See application file for complete search history.

(56) References Cited

U.S. PATENT DOCUMENTS

| | | | | |
|---|---|---|---|---|
| 5,361,705 A * | 11/1994 | Powell | ..................... | A63F 9/143 104/60 |
| 5,522,321 A * | 6/1996 | Mosley | .................. | A63G 25/00 104/165 |
| 5,865,624 A * | 2/1999 | Hayashigawa | .......... | G09B 9/04 434/29 |
| 6,227,120 B1 * | 5/2001 | Fritz | ...................... | A63G 25/00 104/60 |
| 6,463,859 B1 * | 10/2002 | Ikezawa | ............. | A63B 69/0053 104/53 |
| 6,910,972 B2 * | 6/2005 | Norbury | .................. | A63G 7/00 104/60 |
| 7,373,888 B1 * | 5/2008 | Namanny | .............. | A63G 31/04 104/60 |
| 7,685,945 B2 * | 3/2010 | Norbury | ................ | A63G 31/16 104/60 |
| 7,955,168 B2 * | 6/2011 | Mendelsohn | ............ | A63G 1/00 463/2 |
| 9,889,860 B2 * | 2/2018 | Osterman | ............. | B60W 10/20 |
| 10,369,483 B1 * | 8/2019 | Hall | ....................... | A63G 31/02 |
| 2003/0140815 A1 * | 7/2003 | Norbury | ................ | A63G 25/00 104/53 |
| 2004/0266540 A1 | 12/2004 | Norbury | | |
| 2008/0257196 A1 | 10/2008 | Norbury | | |
| 2018/0250601 A1 * | 9/2018 | Schrade | ................ | A63G 33/00 |

FOREIGN PATENT DOCUMENTS

| | | |
|---|---|---|
| JP | H09281883 | 10/1997 |
| JP | 2001129262 | 5/2001 |
| WO | 03041827 | 5/2003 |
| WO | 2006004392 | 1/2006 |
| WO | 2012022383 | 2/2012 |

OTHER PUBLICATIONS

German Patent and Trademark Office, "Office Action" issued in German patent application No. 10 2015 117 012.4, document of 5 pages, dated Apr. 4, 2016.

Japanese Patent Office, "Notice of Reasons for Refusal" and English-translation thereof issued in Japanese patent application No. 2018-517363, dated May 14, 2019, document of 12 pages.

* cited by examiner

INTERACTIVE FAIRGROUND RIDE, IN PARTICULAR ROLLER COASTER

CROSS REFERENCE TO RELATED APPLICATIONS

This application is a § 371 National Phase of PCT/EP2016/062925, filed Jun. 7, 2016, the entirety of which is incorporated by reference and which claims priority to German Patent Application No. 10 2015 117 012.4, filed Oct. 6, 2015.

BACKGROUND

The application relates to an interactive fairground ride, in particular a roller coaster, of the type having the features and structures recited herein.

SUMMARY

Roller coasters normally consist of a rail track which is closed in itself and on which cars with seats for several passengers are moved either by gravity or by means of a drive mechanism.

In order to increase the pleasure of the ride and for increased attractivity, interactive fairground rides, among others, were developed in which the passengers are able to actively intervene in the course of the ride.

From DE 102 45 150 A1, for example, a fairground ride, therein referred to as an amusement ride, is known with which the passengers may compete with each other through individual control of the course of the ride.

Here, the present disclosure sets in.

The application is based on the object of promoting the team behavior of the passengers of a car in this competition.

As with the amusement ride according to DE 102 45 150 A1, every passenger in the car is assigned their own control panel with a control button with which the passenger may influence the course of the ride. In addition, a display unit is provided on which the passenger may monitor the effect of their control. A launch pad with a signal unit which generates a visual and/or an audible start signal in order to initiate the start and which is arranged at the beginning of the track rail is necessary for the detection of the ride data.

According to the principle of the present disclosure, the passengers as a team should together allow the car to start as early as possible.

In order to realize this idea, the control button and, where appropriate, the display units of all control panels of a car are connected, via a transmitter, to an evaluation and control unit which detects the reaction times of all passengers and from these calculates a mean value, the collective reaction time, which is preferably displayed by the display unit, whereupon a signal for starting the car is generated after the expiry of the collective reaction time.

According to the present disclosure, the evaluation and control unit determines a boost factor B based on the collective reaction time t, which is 100% for a reaction time of 0 and 0% for the allowed reaction time of (a).

The present disclosure provides that the start time may be delayed and/or the car speed may be reduced depending on the boost factor.

As disclosed herein, there may exist a linear relationship between the boost factor and the collective reaction time according to the following formula:

$$B\ (\%) = 100(1 - t/a).$$

The individual reaction time of each passenger is detected by the evaluation and control unit after the start signal has been triggered.

The present disclosure provides that in order to avoid that the passenger generates a shortest possible reaction time by excessively pressing the control button before the start signal is triggered, a pre-signal may be generated before the start signal is triggered and which activates the control buttons of all passengers in such a way that the impulses generated by means of the control button in the interval between the pre-signal and the start signal remain unconsidered when determining the reaction time or lead to an increase of the determined reaction time.

The present disclosure further provides that in order for the passengers as well as the outside viewers to be able to observe the reaction of each individual passenger, apart from the determined reaction time and the boost factor of all passengers, the individual reaction time and the individual boost factor of each individual passenger may be determined by the evaluation and control unit and displayed by means of a central display during the entire ride.

According to the present disclosure, each passenger is assigned a display unit which reflects the collective reaction time and the boost factor determined therefrom on a display.

The present disclosure further provides that this display unit may, have additional signal lights for the qualitative visual display of the determined reaction times.

The present disclosure further provides that if the ride is to enable a competition between several teams, several rail tracks with their own launch pads are to be arranged close to each other, preferably parallel to each other.

In one embodiment, the passengers are sent to the track from the launch pad in a predetermined speed. In order to further improve the ride, acceleration tracks with their own drive mechanisms are arranged in the course of the rail tracks which may be influenced, in particular activated, by the passengers by means of the control buttons.

According to the present disclosure, linear motors are preferably suitable as car drive mechanisms.

The signals generated by the passengers may alternatively be transmitted to the evaluation and control unit via radio transmission or via bus bars.

The present disclosure provides that in order to further increase the pleasure of the ride, an effect generator which triggers optical and/or acoustic effects depending on the boost factor is connected to the evaluation and control unit.

According to the present disclosure, the fairground ride has means for collecting the reaction times in order to generate a ranking list from the collected reaction times after at least one ride of the car on the rail track. This may increase a competitive feeling among the passengers. Preferably, the ranking list is generated over a period of several rides.

Within the framework of the present disclosure, it is not absolutely necessary to determine the boost factor from the standstill in order to start the car. According to the present disclosure, the boost factor may be determined by the evaluation and control unit in at least one section of the rail track while the car passes through this section. Preferably, the boost factor is determined when passing through a launch section. In particular, a signal may be generated when entering a corresponding section, for example an acoustic and/or an optical signal, in order to influence the passengers to react quickly.

BRIEF DESCRIPTION OF THE DRAWINGS

The subject matter of the present application is explained in detail hereinafter with reference to schematic drawings.

The drawings show.

The fairground ride whose cars are controlled by the passengers in an interactive manner is not graphically represented. In one embodiment, it consists of a roller coaster with a rail track which is closed in itself and on which cars 10 driven by a motor are moved.

Figure 1:
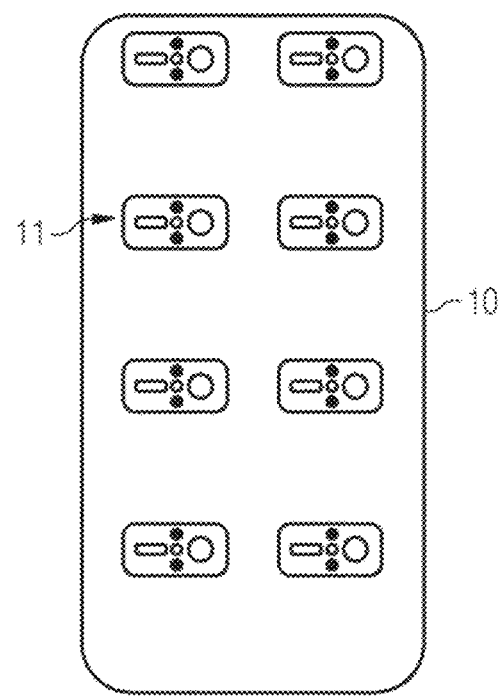
FIG. 1: a schematic plan view of a car with eight seats and control panels assigned thereto.
Figure 2:
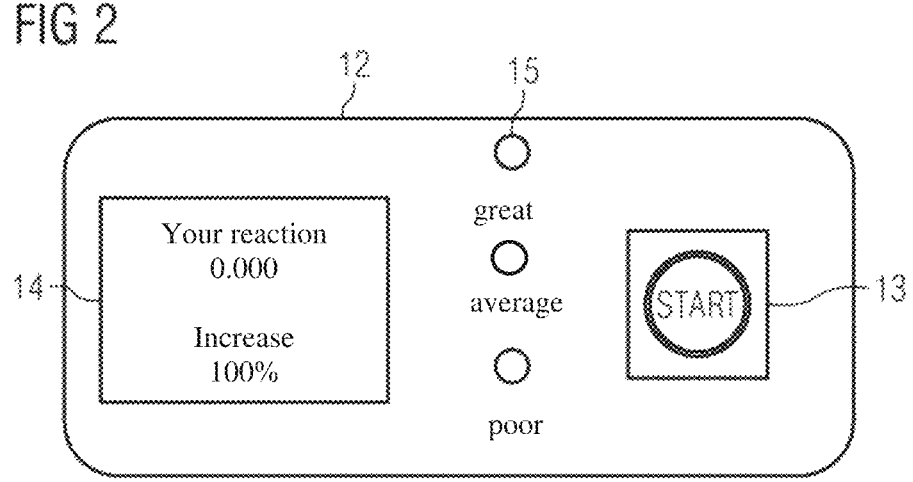
FIG. 2: a plan view of a control panel with a start button, a display unit and signal lights.

The cars 10 schematically shown in FIG. 1 have a number of seats 11, herein eight, each of which is assigned a control panel 12. This control panel 12 has a start button 13, a display unit 14 for displaying the individual reaction time (your reaction) and the individual boost factor as well as signal lights 15 for the qualitative display of the reaction time with the indication "GREAT" for a short reaction time, "AVERAGE" for a medium reaction time and "POOR" for a longer reaction time.

Figure 3:
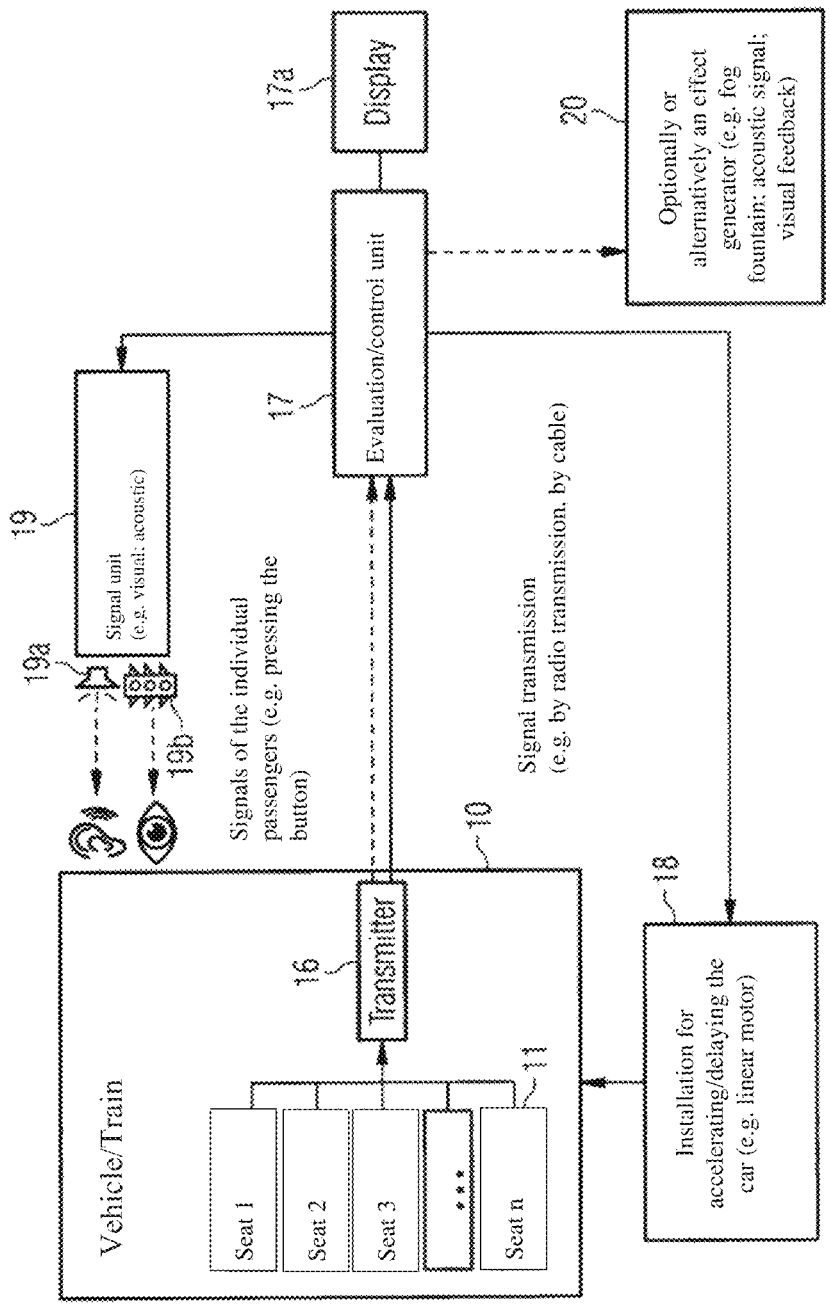
FIG. 3: a block diagram of the interactive fairground ride according to the present disclosure with signal paths illustrated as symbols.

As can be seen in the block diagram according to FIG. 3, the control panels 12 of all seats 11 are connected to a transmitter 16 which transmits the signals generated by the passengers using the control button 13 to the evaluation and control unit 17 via a transmitter 16. The transmission of the transmitter signals may be wireless, i.e. for example by radio transmission, or galvanically by cable, e.g. via bus bars provided along the rail track.

According to the present disclosure, the evaluation and/or control unit 17 evaluates the individual start signals generated by the control buttons in order to determine a collective reaction time, depending on which the control unit generates a start signal which is sent to the device in order to drive the car, i.e. the car drive mechanism 18. The shorter the collective reaction time, the sooner the car 10 is started. It is also possible to influence the car speed of the started car 14 instead of influencing the start time.

The evaluation and control unit 17 also controls a signal unit 19 which generates acoustic and/or visual start signals for the passengers via speakers 19a and/or traffic lights 19b.

Such an installation enables an interactive operation of a ride, e.g. in the following manner.

After the passengers have taken their seats 11 in the car 10, first their attention is gained through the traffic lights 19b or a corresponding acoustic signal of the speaker 19a.

After the expiry of the countdown or after the appearance of the optical start signal on the traffic lights 19b, the timekeeping begins.

From that moment, the passengers must press the start button 13. The time span between the start signal and the pressing of the start button 13 is the individual reaction time.

It is recommended to activate the start button 13 together with the start signal so that an excessive pressing of the button before the release of the signal does not have any effect.

According to another proposal, pressing the button before the start signal is released may also be punished as an early start.

The individual reaction times are transmitted, by means of the transmitter 16, by radio transmission or by cable, to the evaluation and control unit 17 which determines the collective reaction time and calculates a boost factor. A collective reaction time of 0 seconds corresponds to a boost factor of 100%, while a reaction time of a seconds, e.g. 2 seconds, provided by the system, corresponds to a boost factor of 0%.

The connection between the reaction time and the boost factor may be chosen arbitrarily. In the simplest case, it is linear.

The collective reaction time and the boost factor resulting therefrom are displayed on a display 17a which may be monitored by the passengers and by the waiting persons. Either the start time or the start speed may be influenced by means of the boost factor.

If the fairground ride e.g. requires a start speed of 80 km/h and if the maximum allowed start speed is 120 km/h, this results in a maximum allowed boost of 40 km/h, which corresponds to a boost of 100%, while for a minimum start speed of 80 km/h, the boost is 0%.

According to another proposal, the cars are started by the car drive 18 at an equal speed, wherein the individual start time depends on the determined collective reaction time.

The example embodiment illustrated in FIG. 3 also provides a so-called effect generator 20 which may e.g. create a fog fountain, an acoustic or also an optical signal. The effect generator 20 is also controlled by the evaluation and control unit 17 according to a result depending on the individual ride result of the passengers.

REFERENCE NUMERAL LIST

10 Car
11 Seats
12 Control panel
13 Control button
14 Display unit
15 Signal lights
16 Transmitter
17 Evaluation and control unit
17a Display
18 Car drive mechanism
Installation for accelerating/delaying the car
19 Signal unit
19a Speakers
19b Traffic lights
20 Effect generator

The invention claimed is:

1. An interactive fairground ride, comprising:
a rail track;
a passenger car with seats for several passengers, the car guided on the rail track;
a plurality of passenger control panels, wherein the each passenger is provided with a passenger control panel of the plurality of passenger control panels, wherein each passenger control panel comprises:
a start button; and
a display unit;
a launch pad with a signal unit located at the beginning of the rail track, wherein the signal unit generates one of a visual signal, an acoustic signal, or both a visual and acoustic signal, and
an evaluation and control unit;
wherein one of the start button, the display unit, or both the start button and the display unit, of the control panel of the plurality of control panels are connected to the evaluation and control unit via a transmitter, wherein the evaluation unit and control unit captures a reaction time of a passenger and calculates one of a mean value, a collective reaction time (t), or both a mean value and a collective reaction time (t), wherein one of the mean value, the collective reaction time (t), or both the mean value and the collective reaction time (t), are displayed by the display unit, and wherein a start signal for the car is generated after an expiry of the collective reaction time (t).

2. The interactive fairground ride according to claim 1, wherein the evaluation and control unit determines, based on the collective reaction time (t), a boost factor (B) which influences one of a start time, car speed, or both the start time and the car speed, wherein the boost factor (B) is displayed by the display unit next to the collective reaction time, wherein a collective reaction time (t) of 0 corresponds to a boost factor of 100% and an allowed reaction time (a) corresponds to a boost factor (B) of 0%.

3. The interactive fairground ride according to claim 2, further comprising:
an effect generator communicable coupled to the evaluation and control unit, wherein the effect generator triggers optical, acoustic effects, or both optical and acoustic effects.

4. The interactive fairground ride according to claim 2, wherein the boost factor (B) may be determined by the evaluation and control unit in a section of the rail track while the car passes through the section of the rail track.

5. The interactive fairground ride according to claim 1, wherein depending on a boost factor (B), the start time is delayed, the car speed is reduced, or both the start time is delayed and the car speed is reduced.

6. The interactive fairground ride according to claim 5, further comprising a linear connection between the boost factor (B) and the collective reaction time (t), where (a) is an allowed reaction time, according to the formula:

$$B\ (\%)=100(1-t/a)$$

7. The interactive fairground ride according to claim 1, wherein timekeeping begins after the start signal is triggered,
wherein before the start signal is triggered, a pre-signal is generated, and
wherein the start button is activated in such a way that impulses generated by the start button during a period between the pre-signal and the start signal remain unconsidered when determining the reaction time.

8. The interactive fairground ride according to claim 1, wherein apart from the determined collective reaction time (t) and the boost factor (B) of all passengers, an individual reaction time and an individual boost factor of every individual passenger is determined by the evaluation and control unit and displayed during the entire ride by the display.

9. The interactive fairground ride according to claim 1, wherein the control panel further comprises a signal light that qualitatively displays determined reaction times.

10. The interactive fairground ride according to claim 1, further comprising:
several rail tracks with their own launch pads are arranged at a small distance to each other.

11. The interactive fairground ride according to claim 1, wherein in the course of the rail tracks, further acceleration tracks with their own drive units are arranged which may be influenced by the passengers by the control button.

12. The interactive fairground ride according claim 1, wherein a car drive mechanism of the passenger car is a linear motor.

13. The interactive fairground ride according to claim 1, a signal of the passenger control panel is transmitted to the evaluation and control unit via radio transmission or via bus bars.

14. The interactive fairground ride according to claim 1, wherein the fairground ride collects the reaction times in order to generate a ranking list from the collected reaction times after at least one ride of the car on the rail track.

15. An amusement park ride system, comprising:
a plurality of passenger control panels for a passenger car that is guided on a rail track, wherein each passenger control panel of the plurality of passenger control panels comprises:
a start button; and
a display unit;
a signal unit located at a beginning of the rail track, wherein the signal unit generates a start signal, and
an evaluation and control unit that receives signals of the plurality of passenger control panels,
wherein, based on a plurality of passenger reaction times, the evaluation unit and control calculates one of a mean value, a collective reaction time (t), or both a mean value and a collective reaction time (t),
wherein one of the mean value, the collective reaction time (t), or both the mean value and the collective reaction time (t), are displayed by the display unit,
wherein a start signal for the car is generated after an expiry of the collective reaction time (t);
wherein the evaluation and control unit determines, based on the collective reaction time (t), a boost factor (B) which influences one of a start time, passenger car speed, or both the start time and the passenger car speed,
wherein the boost factor (B) is displayed by the display unit next to the collective reaction time, wherein a collective reaction time (t) of 0 corresponds to a boost factor of 100% and an allowed reaction time (a) corresponds to a boost factor (B) of 0%.

16. The amusement park ride system according to claim 15,
wherein based on the boost factor (B), the start time is delayed, the car speed is reduced, or both the start time is delayed and the car speed is reduced.

17. The amusement park ride system according to claim 15,
wherein boost factor (B) is determined according to the formula:

$$B\ (\%)=100(1-t/a)$$

18. The amusement park ride system according to claim 15, further comprising:
an effect generator communicable coupled to the evaluation and control unit, wherein the effect generator triggers optical, acoustic effects, or both optical and acoustic effects; and
wherein the control panel further comprises a signal light that qualitatively displays determined reaction times.

* * * * *